United States Patent
Opdenbosch

(10) Patent No.: US 9,740,959 B2
(45) Date of Patent: Aug. 22, 2017

(54) ACCELERATION OF EXPOSURE FUSION WITH PIXEL SHADERS

(71) Applicant: Trimble Inc., Sunnyvale, CA (US)

(72) Inventor: Augusto Opdenbosch, Alpharetta, GA (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 15/069,777

(22) Filed: Mar. 14, 2016

(65) Prior Publication Data

US 2016/0267695 A1    Sep. 15, 2016

Related U.S. Application Data

(60) Provisional application No. 62/133,220, filed on Mar. 13, 2015.

(51) Int. Cl.
| | |
|---|---|
| *G06K 9/00* | (2006.01) |
| *G06K 9/46* | (2006.01) |
| *G06K 9/52* | (2006.01) |
| *G06K 9/62* | (2006.01) |

(Continued)

(52) U.S. Cl.
CPC ......... *G06K 9/4661* (2013.01); *G06K 9/4652* (2013.01); *G06K 9/52* (2013.01); *G06K 9/6201* (2013.01); *G06T 5/009* (2013.01); *G06T 5/50* (2013.01); *G06T 2200/28* (2013.01); *G06T 2207/10016* (2013.01); *G06T 2207/10024* (2013.01); *G06T 2207/10144* (2013.01);

(Continued)

(58) Field of Classification Search
CPC .. G06K 9/4652; G06K 9/4661; G06K 9/6201; G06T 2207/20221
See application file for complete search history.

(56) References Cited

U.S. PATENT DOCUMENTS

| | | | |
|---|---|---|---|
| 2010/0329554 A1* | 12/2010 | Zhai ..................... | G09G 3/2003 382/167 |
| 2013/0028509 A1* | 1/2013 | Moon .................. | H04N 5/2355 382/162 |

(Continued)

OTHER PUBLICATIONS

Burt, P. et al., "The Laplacian Pyramid as a Compact Image Code," IEEE Transactions on Communications, vol. Com-31, No. 4, Apr. 1983, 9 pages.

(Continued)

*Primary Examiner* — Phuoc Tran
(74) *Attorney, Agent, or Firm* — Kilpatrick Townsend & Stockton LLP

(57) ABSTRACT

A method of fusing images includes encoding first image data of a pixel in a first image and second image data of a like pixel in a second image. The first image and the second image have different exposures and are captured by an image capture device of the same scene from the same location, and the pixel and the like pixel map to an identical coordinate location within their respective images. The method also includes determining, by a graphics processing unit (GPU), a first quality measure for the first image data and a second quality measure for the second image data. A weighted blending of the first image data with the second image data is performed to achieve fused image data for a third pixel at the identical coordinate location in a fused image.

20 Claims, 5 Drawing Sheets

(51) Int. Cl.
*G06T 5/00* (2006.01)
*G06T 5/50* (2006.01)

(52) U.S. Cl.
CPC .............. *G06T 2207/20016* (2013.01); *G06T 2207/20208* (2013.01); *G06T 2207/20221* (2013.01)

(56) References Cited

U.S. PATENT DOCUMENTS

2015/0348242 A1* 12/2015 Molgaard ................. G06T 5/50 348/241
2015/0350513 A1* 12/2015 Zhang ...................... H04N 5/91 348/362

OTHER PUBLICATIONS

Mertens, T., et al., "Exposure Fusion," Hasselt University—EDM transationale Universiteit Limburg, Belgium; University College London UK, 9 pages.

* cited by examiner

400

┌─────────────────────────────────────────────────────────────────┐
│ ENCODE IMAGE DATA OF A PIXEL IN A FIRST IMAGE TO A VALUE BETWEEN 0 AND 1 │
│ 410 │
└─────────────────────────────────────────────────────────────────┘
↓
┌─────────────────────────────────────────────────────────────────┐
│ DETERMINE, BY A GRAPHICS PROCESSING UNIT (GPU), A QUALITY MEASURE OF THE IMAGE DATA, WHEREIN THE QUALITY MEASURE RANGES BETWEEN BETWEEN 0 AND 1 │
│ 420 │
└─────────────────────────────────────────────────────────────────┘
↓
┌─────────────────────────────────────────────────────────────────┐
│ ENCODE SECOND IMAGE DATA OF A LIKE PIXEL IN A SECOND IMAGE TO A VALUE BETWEEN 0 AND 1, WHEREIN THE FIRST IMAGE AND THE SECOND IMAGE ARE DIFFERENT EXPOSURES CAPTURED BY A DIGITAL IMAGE CAPTURE DEVICE OF THE SAME SCENE FROM THE SAME LOCATION OF CAPTURE, AND WHERE THE PIXEL AND THE LIKE PIXEL MAP TO AN IDENTICAL COORDINATE LOCATION WITHIN THEIR RESPECTIVE IMAGES │
│ 430 │
└─────────────────────────────────────────────────────────────────┘
↓
┌─────────────────────────────────────────────────────────────────┐
│ DETERMINE, BY THE GPU, A SECOND QUALITY MEASURE FOR THE SECOND IMAGE DATA, WHEREIN THE SECOND QUALITY MEASURE RANGES BETWEEN 0 AND 1 │
│ 440 │
└─────────────────────────────────────────────────────────────────┘
↓
┌─────────────────────────────────────────────────────────────────┐
│ GLOBALLY ENCODE, BY THE GPU, THE QUALITY MEASURE AND THE SECOND QUALITY MEASURE, BASED ON A NUMBER OF IMAGES TO BE FUSED, TO ACHIEVE A GLOBALLY ENCODED QUALITY MEASURE AND A SECOND GLOBALLY ENCODED QUALITY MEASURE, WHEREIN A SUM OF THE GLOBALLY ENCODED QUALITY MEASURE AND THE SECOND GLOBALLY ENCODED QUALITY MEASURE IS BETWEEN 0 AND 1 │
│ 450 │
└─────────────────────────────────────────────────────────────────┘
↓
┌─────────────────────────────────────────────────────────────────┐
│ PERFORM, BY A PIXEL SHADER OF THE GPU, A WEIGHTED BLENDING OF THE IMAGE DATA WITH THE SECOND IMAGE DATA, BASED ON THE GLOBALLY ENCODED QUALITY MEASURE AND THE SECOND GLOBALLY ENCODED QUALITY MEASURE, TO ACHIEVE A FUSED IMAGE DATA FOR A THIRD PIXEL AT THE IDENTICAL LOCATION IN A FUSED IMAGE │
│ 460 │
└─────────────────────────────────────────────────────────────────┘
↓
┌─────────────────────────────────────────────────────────────────┐
│ OUTPUT, BY THE PIXEL SHADER, THE FUSED IMAGE DATA FOR INCLUSION IN THE FUSED IMAGE │
│ 470 │
└─────────────────────────────────────────────────────────────────┘

FIG. 4A

ACCELERATION OF EXPOSURE FUSION
WITH PIXEL SHADERS

CROSS-REFERENCE TO RELATED
APPLICATIONS

This application claims priority to U.S. Provisional Application No. 62/133,220, filed Mar. 13, 2015, the contents of which are incorporated herein by reference in their entirety for all purposes.

BACKGROUND

A variety of techniques exist to combine multiple exposures of a scene into a single image. One technique is High Dynamic Range (HDR) imaging, which requires utilizing a high dynamic range of a digital image capture device. HDR images typically have a higher range of expanded intensities than any display device, include a great deal of information, and require a special format for storage in comparison to normal (non-HDR) images. Another technique is exposure fusion. Exposure fusion fuses together bracketed exposures of different images that are all within the normal dynamic range of a digital image capture device. During fusion, different exposures of a scene are fused together to combine the best parts of each of the different exposures in a single fused image. Exposure fusion is a very computationally intensive operation. Conventionally, exposure fusion is performed by central processing units and may, because of the computational intensity, take several minutes to fuse two or three exposures into a single fused image. Fusing together more images takes even longer. Because of this, exposure fusion is not conventionally viewed as a real-time or near-real time process. Instead, exposure fusion is typically performed post-processing.

There are some drawbacks to performing exposure fusion in a post-processing environment. First, since numerous images are captured to be fused together later, a large amount of storage may be required on the electronic device that captures the images. This can drive up the cost of the electronic device. Alternatively, a communicative coupling from an image capture device to a remote storage may be used to alleviate the need for large amounts of onboard storage. However, in some locales, a reliable (or any) communicative coupling to a remote storage may be unavailable. Additionally, since the ultimate results of a fused image are not available in real-time, it will either take a long time to capture and fuse images on location, or a risk must be taken that the captured exposures of a scene are sufficient to successfully post-process a fused image of the desired quality. In the case of post-processing, lack of sufficient exposures may cause expensive and time-consuming re-work to acquire the needed exposures of the scene.

SUMMARY

Several non-limiting example embodiments are described below in a brief format.

In accordance with an embodiment, a method of fusing images includes encoding first image data of a pixel in a first image to a value between 0 and 1. A first quality measure of the first image data is determined by a graphics processing unit (GPU). A value of the first quality measure ranges between 0 and 1. Second image data of a like pixel in a second image is encoded to a value between 0 and 1. The first image and the second image have different exposures and are captured by a digital image capture device of the same scene from the same location of capture, and the pixel and the like pixel map to an identical coordinate location within their respective images. A second quality measure for the second image data is determined by the GPU. A value of the second quality measure ranges between 0 and 1. The first quality measure and the second quality measure are globally encoded by the GPU, based on a number of images to be fused, to achieve a first globally encoded quality measure and a second globally encoded quality measure. A sum of the first globally encoded quality measure and the second globally encoded quality measure is between 0 and 1. A weighted blending of the first image data with the second image data is performed by a pixel shader of the GPU, based on the first globally encoded quality measure and the second globally encoded quality measure, to achieve fused image data for a third pixel at the identical coordinate location in a fused image. The fused image data is output by the pixel shader for inclusion in the fused image to provide the fused image with improved exposure compared to either the first image or the second image.

In an embodiment, the first image data and the second image data each comprise values for colors red, green, and blue; and a value for at least one of transparency or opacity. Encoding the first image data may comprise encoding the value of the at least one of transparency or opacity for the pixel in the first image. Encoding the second image data may comprise encoding the value of the at least one of transparency or opacity for the like pixel in the second image.

In another embodiment, the first quality measure and the second quality measure each comprise at least one of a measure of contrast quality, a measure of saturation quality, or a measure of exposure quality for the pixel and the like pixel respectively.

In another embodiment, the first globally encoded quality measure and the second globally encoded quality measure are each encoded based on the first quality measure, the second quality measure, and the number of images to be fused.

In another embodiment, the weighted blending of the first image data with the second image data comprises blending a value for color red of the first image data with a value for the color red of the second image data, blending a value for color green of the first image data with a value for the color green of the second image data, blending a value for color blue of the first image data with a value for the color blue of the second image data, and blending a value for at least one of transparency or opacity of the first image data with a corresponding value of the second image data.

In another embodiment, the weighted blending of the first image data with the second image data is performed at multiple levels of a Laplacian pyramid.

In yet another embodiment, the method includes concurrently operating n pixel shaders of the GPU in parallel to fuse image data for n pairs of like located pixels in the first image and in the second image, wherein n is greater than 1 and less than or equal to the number of pixel shaders of the GPU.

In accordance with an embodiment, an electronic device includes a memory configured to store a first digital image and a second digital image and a GPU coupled with the memory. The GPU is configured to determine a first quality measure for first image data of a pixel in a first image and to determine a second quality measure for second image data of a like pixel in a second image. The first image and the second image have different exposures and are captured by a digital image capture device of the same scene from the same location of capture, and the pixel and the like pixel map to an identical coordinate location within their respective images. A pixel shader of the GPU determines a weighted blending of the first image data with the second image data, based on a first globally encoded quality measure and a second globally encoded quality measure, to achieve fused image data for a third pixel at the identical coordinate location in a fused image. The fused image data is output for inclusion in the fused image.

In an embodiment, the GPU is further configured to encode the first image data of the pixel in the first image to a value between 0 and 1, encode the second image data of the like pixel in the second image to a value between 0 and 1, and globally encode the first quality measure and the second quality measure, based on a number of images to be fused, to achieve the first globally encoded quality measure and the second globally encoded quality measure. A value of the first quality measure ranges between 0 and 1, a value of the second quality measure ranges between 0 and 1, and a sum of the first globally encoded quality measure and the second globally encoded quality measure is between 0 and 1.

In another embodiment, the electronic device includes a digital camera and the memory and GPU are disposed within the digital camera.

In another embodiment, the electronic device includes an output configured to display the fused image.

In yet another embodiment, the GPU is further configured to operate n pixel shaders in parallel to fuse image data for n pairs of like located pixels in the first image and in the second image, wherein n is greater than 1 and less than or equal to the number of pixel shaders of the GPU.

In accordance with yet another embodiment, a non-transitory computer-readable storage medium comprises instructions embodied thereon which, when executed, cause an electronic device to perform a method of fusing images that includes encoding first image data of a pixel in a first image. A first quality measure of the first image data is determined by a graphics processing unit (GPU). Second image data of a like pixel in a second image is encoded. The first image and the second image have different exposures and are captured by a digital image capture device of the same scene from the same location of capture, and the pixel and the like pixel map to an identical coordinate location within their respective images. A second quality measure for the second image data is determined by the GPU. The first quality measure and the second quality measure are globally encoded by the GPU, based on a number of images to be fused, to achieve a first globally encoded quality measure and a second globally encoded quality measure. A weighted blending of the first image data with the second image data is performed by a pixel shader of the GPU, based on the first globally encoded quality measure and the second globally encoded quality measure, to achieve fused image data for a third pixel at the identical coordinate location in a fused image. The fused image data is output by the pixel shader for inclusion in the fused image.

In an embodiment, the first image data and the second image data are encoded to values between 0 and 1, values of the first quality measure and the second quality measure range between 0 and 1, and a sum of the first globally encoded quality measure and the second globally encoded quality measure is between 0 and 1.

In some embodiments the encoded image data, quality measures, and/or encoded global quality measures may have values based on different scales and/or ranges (e.g., 0 to 100).

BRIEF DESCRIPTION OF DRAWINGS

The accompanying drawings, which are incorporated in and form a part of the Description of Embodiments, illustrate various embodiments and, together with the Description of Embodiments, serve to explain principles discussed below, where like designations denote like elements.

FIGS. 4A and 4B illustrate a flow diagram of exemplary methods of exposure fusion, according to various embodiments.

DESCRIPTION OF EMBODIMENTS

Figure 1:
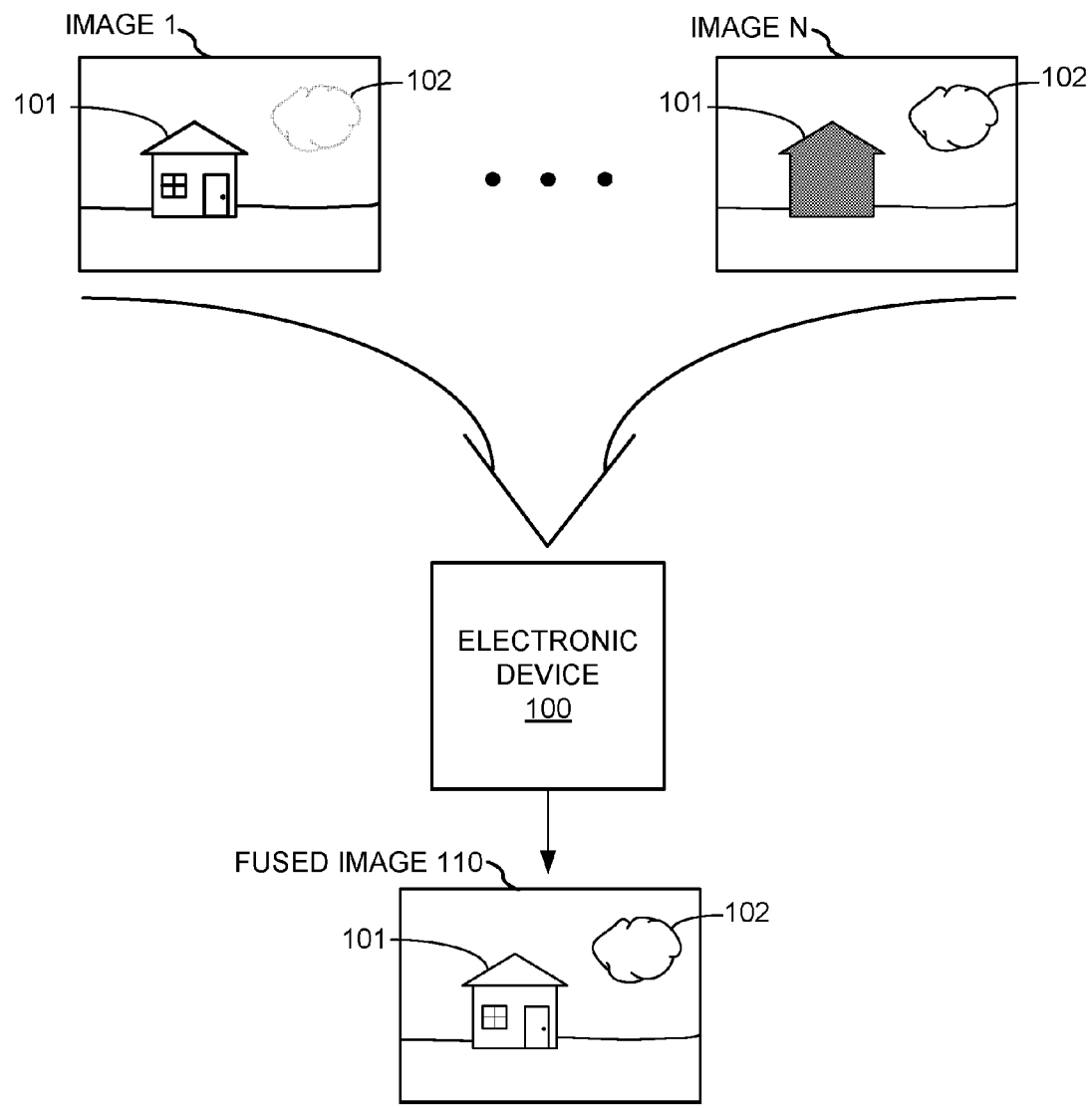
FIG. 1 illustrates a plurality of differently exposed images of a scene being fused by an electronic device into a single fused image, according to an embodiment.

Reference will now be made in detail to various embodiments, examples of which are illustrated in the accompanying drawings. While various embodiments are discussed herein, it will be understood that they are not intended to limit to these embodiments strictly to the descriptions. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "encoding," "determining," "performing," "outputting," "accessing," and "operating," or the like, refer to the actions and processes of a computer system or similar electronic computing device which includes a GPU, some non-limiting examples of which include: a digital camera, a smart phone, a tablet computer, a server, a notebook computer, a laptop computer, a desktop computer, a blade computer, and a surveying device. For purposes of convenience, the computer system or similar electronic computing device will be generally referred to herein as an "electronic device." The electronic device manipulates and transforms data represented as physical (electronic) quantities within registers and memories into other data similarly represented as physical quantities that may be displayed, transmitted, output, stored, and/or further manipulated by the electronic device.

Overview

The basic idea of exposure fusion, as conventionally known, is that pixels in the input images of multiple different exposures are weighted according to qualities such as contrast, saturation, and exposure. These weights are then used to determine how much a given pixel in an image being fused with one or more other images will contribute to the final fused image. A description of the conventional technique for exposure fusion is described in the paper "Exposure Fusion" by Tom Mertens, Jan Kautz and Frank Van Reeth, (In proceedings of Pacific Graphics 2007, Maui, Hi., Oct. 29-Nov. 2, 2007). The techniques for exposure fusion described herein are at least partially carried out on one or more GPUs. In general, a GPU has many more cores than a central processing unit (CPU), and can thus conduct many similar operations in parallel. The Exposure Fusion paper by Mertens, Kautz, and Van Reeth opines that, " . . . we expect that our algorithm could eventually run in real-time on graphics hardware." Based on empirical data, this is a true statement, as it generally takes several minutes to fuse 2 or 3 images using conventional techniques implemented on CPUs. In contrast, using techniques described herein, 2-3 images can be fused using GPUs in well less than a second—making exposure fusion, using the techniques described herein, a real time process.

Unfortunately, the Exposure Fusion paper by Mertens, Kautz, and Van Reeth provides no direction, teachings, or suggestions on how to implement their techniques with GPUs. This is a non-trivial matter because GPUs and CPUs operate in vastly different manners.

In particular, numerous techniques are described herein for carrying out exposure fusion operations using pixel shaders of one or more GPUs. Pixel shaders are subprocesses of GPUs that operate on pixels. Pixel shaders compute color and other attributes of each pixel. Pixel shaders are normally used to process graphics rather than images.

Discussion begins with a broad description of exposure fusion of a plurality of images by an exemplary electronic device. The exemplary electronic device, and some components thereof, is then described. The electronic device is an example of a device which or upon which various exposure fusion embodiments described herein may be implemented. This is followed by presenting a more detailed block diagram of a GPU of the electronic device. Operation of the electronic device, and various components thereof, is then further described in conjunction with description of an exemplary method of exposure fusion.

High-Level Example of Exposure Fusion

FIG. 1 illustrates a method by which a plurality of differently exposed images (1 . . . N) of a scene being fused by an electronic device into a single fused image, according to an embodiment. Image 1 includes overexposed portions, of a scene with a house 101 and a cloud 102. In Image 1, the features of house 101 are visible, but cloud 102 is overexposed and barely visible. Image N includes underexposed portions and is a second, different exposure of the same scene as is depicted in Image 1 with house 101 and cloud 102. In Image N, the features of house 101 are not visible due to under exposure, but cloud 102 is visible.

It should be appreciated that Images 1 through N are captured with the same image capture device from the same image capture location and map, pixel per pixel, with one another. Multiple exposures of a scene, as depicted by Images 1 through N are normally captured by mounting an image capture device, such as a digital camera, on a stationary tripod so that the pixels in the multiple exposures will register with one another.

As depicted in FIG. 1, at least two of the Images 1 through N are provided to (and in some embodiments may be captured by) electronic device 100, which fuses the images into a fused image 110 by conducting some or all of the fusion operations upon one or more graphics processing units (GPUs). The fused image 110 incorporates weighted qualities of various portions of the input Images 1 through N so that higher quality portions of an individual input image are included in or given greater weight in the fused image 110. As depicted, fused image 110 includes a house 101 which is properly exposed and a cloud 102 which is properly exposed. It should be appreciated that the fusion process carried out by electronic device 100, and the fused image 110 output by electronic device 100, similarly fuse together the best features of saturation and contrast from input Images 1 through N. However, because of the limitations of black and white line drawings, this is not visually demonstrated by FIG. 1.

Example Electronic Device for Performing Exposure Fusion

Figure 2:
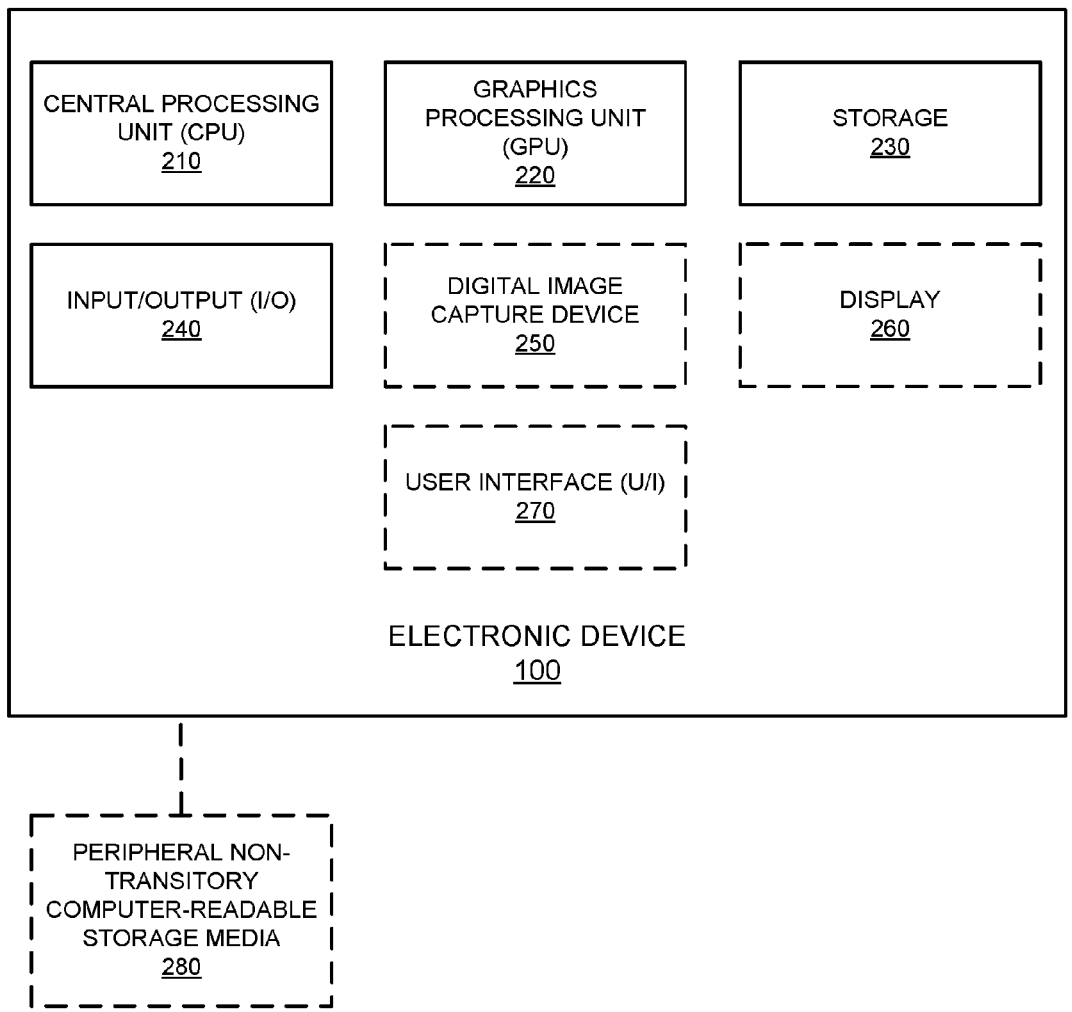
FIG. 2 illustrates a simplified block diagram of some components of an exemplary electronic device that may be utilized to perform exposure fusion, according to various embodiments.

FIG. 2 illustrates one example of a type of an electronic device (electronic device 100) that can be used in accordance with or to implement various embodiments which are discussed herein. It is appreciated that electronic device 100 of FIG. 2 is only an example and that embodiments as described herein can operate on or within a number of different electronic devices including, but not limited to, a digital camera, a smart phone, a tablet computer, a server, a notebook computer, a laptop computer, a desktop computer, a blade computer, and a surveying device (e.g., a total station).

Electronic device 100 of FIG. 2 includes at least one central processing unit (CPU) 210, at least one graphics processing unit (GPU) 220, storage 230, and an input/output 240. In some embodiments, electronic device 100 may additionally include one or more of a digital image capture device 250, a display 260, and a user interface 270. These components are communicatively coupled with one another, such as by busses, for communicating information and instructions. CPU 210 is for processing information and instructions. GPU 220 is also for processing information and instructions, but is specialized (as is known in the art) for handling graphical computations. Storage 230 is for storing information (such as digital images, such as Images 1 . . . N of FIG. 1) and instructions. Storage 230 may be, for example, one or some combination of random access memory (RAM), read only memory (ROM), a data storage unit (e.g., a magnetic or optical disk and disk drive). I/O 240 is for coupling electronic device 100 with external entities. For example, in some embodiments, I/O 240 is a modem for enabling wireline or wireless communications between electronic device 100 and an external device and/or external network such as, but not limited to, the Internet. Additionally or alternatively, in some embodiment, I/O 240 incorporates a serial bus for enabling wireline communications between electronic device 100 and an external device and/or external network such as, but not limited to, the Internet.

Image capture device 250, when included, captures and encodes digital images through use of an image sensor. Display 260, when included, operates to visually display images captured, input to, or fused by electronic device 100 and/or to display a portion of a user interface 270. User interface 270, when included, is for communicating information and command selections from a user to electronic device 100.

Electronic device 100 of FIG. 2 is well adapted to having peripheral, non-transitory, computer-readable storage media 280 such as, for example, a floppy disk, a compact disc (CD), digital versatile disc (DVD), other disc based storage, universal serial bus "thumb" drive, removable memory card, removable hard disk drive (HDD), random access memory (RAM), read only memory (ROM), and the like coupled thereto.

Example Graphic Processing Unit

Figure 3:
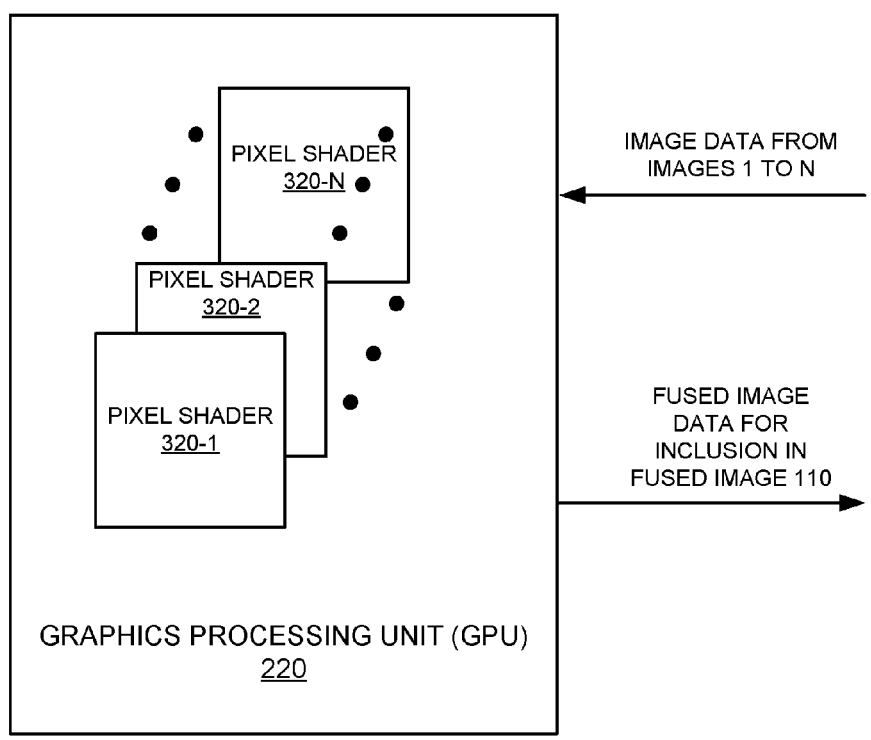
FIG. 3 illustrates a simplified block diagram of some components of a graphics processing unit, according to various embodiments.

FIG. 3 illustrates a simplified block diagram of some components of a graphics processing unit (GPU) 220, according to various embodiments. As depicted, GPU 220 includes a plurality of pixel shaders (320-1, 320-2 . . . 320-N) which can be programmed to conduct parallel operations of the same sort. The number of pixel shaders 320 in a GPU varies. A GPU in a handheld device such as a smartphone may have nearly 100 pixel shaders 320, while a notebook computer may have thousands of pixel shaders 320 in one or some combination of GPUs 220. A pixel shader 320 can be programmed to run as an algorithm on a GPU 220 in order to perform operations with respect to a single fragment (typically a single pixel) of an image. In a GPU with thousands of pixel shaders 320, each pixel shader 320 can simultaneously conduct similar operations on a single pixel of an image. For example, in a GPU with 2,000 pixel shaders, similar operations may be performed in parallel on up to 2,000 different pixels of an image or set of images.

As depicted in FIG. 3, image data from the pixels of Images 1 to N, which are being fused together, is provided as input to GPU 220 for fusing. As described below in conjunction with FIGS. 4A and 4B, some of the provided input information is encoded either by GPU 220 or by CPU 210 before it is operated on by one or more pixel shaders 320. Additionally, while internally operating to fuse image data from Images 1 to N, one or more pixel shaders 320 may encode the information being fused such that it does not exceed output threshold parameters of a pixel shader when it is processed into the fused image data (i.e., fused pixels) that are included in a fused image that is output from GPU 220.

Exemplary Methods of Operation

Figure 4B:
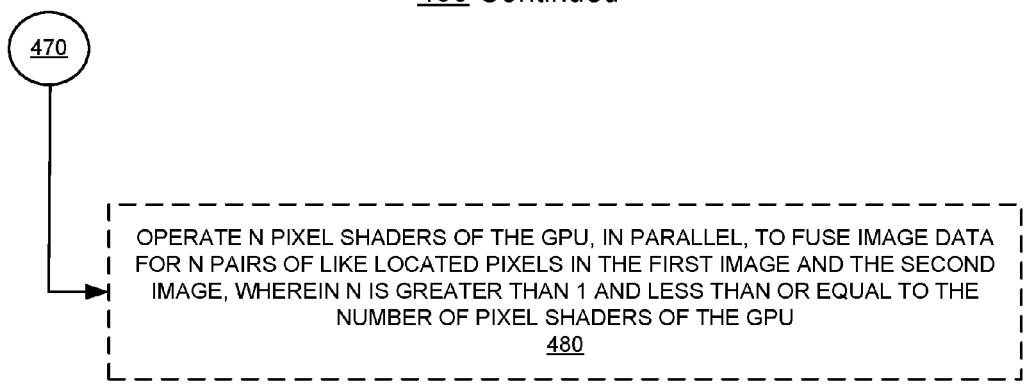

FIGS. 4A and 4B illustrate a flow diagram 400 of methods of exposure fusion according to various embodiments. Procedures of these methods will be described with reference to elements and/or components of one or more of FIGS. 1-3. It is appreciated that in some embodiments, the procedures may be performed in a different order than described, that some of the described procedures may not be performed, and/or that one or more additional procedures to those described may be performed.

In various implementations, all, or a portion of the embodiments described by flowchart 400, can be implemented using computer-executable instructions which reside, for example, in or upon a non-transitory computer-readable storage medium that can be accessed by an electronic device (e.g., electronic device 100) which includes a GPU. The non-transitory computer-readable storage medium can be any kind of non-transitory medium in or upon which computer-readable instructions can be stored. Examples of the non-transitory computer-readable storage medium include, but are not limited to, a hard disk drive (HDD), a compact disc (CD), a digital versatile disc (DVD), read only memory (ROM), random access memory (RAM), flash memory, and so on. As described above, certain procedures of the embodiments as described herein are realized, in some embodiments, as a series of instructions (e.g., a software program) that reside within or upon a non-transitory computer-readable storage medium accessed by an electronic device and that are executed at least partially by a GPU of the electronic device, and in some cases may also be partially executed by a central processing unit or other non-GPU processor of the electronic device. When executed, the instructions cause the GPU and possibly other portions of the electronic device to implement the procedures of and associated with flowchart 400. It is further appreciated that procedures described in flow diagram 400 may be implemented with hardware; a combination of hardware and firmware; a combination of hardware and software; or in a combination of hardware, software, and firmware.

With reference to FIG. 4A, at procedure 410 of flow diagram 400, in one embodiment, image data of a pixel in a first image is encoded to a value between 0 and 1. Image 1 of FIG. 1 is an example of the first image. As previously discussed, a pixel shader of a GPU can only accept input data with values in a range between 0 and 1 in some embodiments. Red, Green, and Blue (RGB) values may already be in this range in some cases, but other data, which represents transparency, opacity, contrast, exposure, and/or the like, may not be. For example, some data may range from negative to positive. Maximum and minimum native values of the data being encoded are utilized to guide shifting (for values that range below 0) and scaling (for data that has a range greater than 0 to 1). For example, if a native data range for a particular type of data is −2 to +2, then each item of data could be shifted by +2 and then divided by +4 to encode it to a range of 0 to 1. In various embodiments, this encoding can be accomplished by GPU 220 (outside of a pixel shader) of electronic device 100, by CPU 210 of electronic device 100, or by another processor or device external to electronic device 100.

With continued reference to FIG. 4A, at procedure 420 of flow diagram 400, in one embodiment, a Graphics Processing Unit (GPU) 220 determines a quality measure of the image data, wherein the quality measure ranges between 0 and 1. The quality measure may be an aggregate measure of several sub-measures, in some embodiments. For example, the quality measure may aggregate a measure of contrast quality of the image data; a measure of saturation quality of the image data; a measure of exposure quality of the image data (e.g., exposedness), and/or the like. Each of these aggregated sub-measures (contrast quality, saturation quality, and exposure quality) is calculated separately and then the sub-measures are aggregated, such as by multiplication or addition. The entire calculation of the quality measure of the image data may be calculated by a GPU 220, such as in a pixel shader 320. When a pixel shader calculates the quality measure of the image data, it encodes it to range of between 0 and 1 and then subtracts a trivial amount (e.g., 0.000001 in a pixel shader that operates at 6 significant digits to the right of the decimal point) when needed to prevent the output from being a value of 1. This encoding occurs because a pixel shader can only output a value between 0 and just less than 1 (i.e., 0 to 0.999999 in a pixel shader that operates at 6 significant digits to the right of the decimal point).

With continued reference to FIG. 4A, at procedure 430 of flow diagram 400, in one embodiment, second image data of a like pixel in a second image is encoded to a value between 0 and 1. The first image and the second image are different exposures, captured by a digital image capture device, of the same scene from the same location of capture, and where the pixel and the like pixel map to an identical coordinate location within their respective images. Image N of FIG. 1 is an example of the second image. As previously discussed, a pixel shader of a GPU can only accept input data with values in a range between 0 and 1. Red, Green, and Blue (RGB) values may already be in this range in some cases, but other data, which represents transparency, opacity, contrast, exposure, and/or the like, may not be. For example, some data may range from negative to positive. Maximum and minimum native values of the data being encoded are utilized to guide shifting (for values that range below 0) and scaling (for data that has a range greater than 0 to 1). For example, if a native data range for a particular type of data is −10 to +10, then each item of data could be shifted by +10 and then divided by +20 to encode it to a range of 0 to 1. In various embodiments, this encoding can be accomplished by GPU 220 (outside of a pixel shader) of electronic device 100, by CPU 210 of electronic device 100, or by another processor or device external to electronic device 100.

With continued reference to FIG. 4A, at procedure 440 of flow diagram 400, in one embodiment, the GPU 220 determines a second quality measure for the second image data, wherein the second quality measure ranges between 0 and 1. The second quality measure may be an aggregate measure of several sub-measures, in some embodiments. For example, the second quality measure may aggregate a measure of contrast quality of the second image data; a measure of saturation quality of the second image data; a measure of exposure quality of the second image data (e.g., exposedness), and/or the like. Each of these aggregated sub-measures (contrast quality, saturation quality, and exposure quality) is calculated separately and then the sub-measures are aggregated, such as by multiplication or addition. The entire calculation of the second quality measure of the second image data may be calculated by a GPU 220, such as in a pixel shader 320. When a pixel shader calculates the second quality measure of the second image data, it encodes it to range of between 0 and 1 and then subtracts a trivial amount (e.g., 0.000001 in a pixel shader that operates at 6 significant digits to the right of the decimal point) when needed to prevent the output from being a value of 1. This encoding occurs because a pixel shader can only output a value between 0 and just less than 1 (i.e., 0 to 0.999999 in a pixel shader that operates at 6 significant digits to the right of the decimal point).

With continued reference to FIG. 4A, at procedure 450 of flow diagram 400, in one embodiment, the GPU 230 globally encodes the first quality measure and the second quality measure, based on a number of images to be fused, to achieve a first globally encoded quality measure and a second globally encoded quality measure, wherein a sum of the first globally encoded quality measure for a pixel of the first image and the second globally encoded quality measure for a corresponding pixel of the second image is between 0 and 1. Equation 1 provides an example of global encoding of the quality measure for a pixel of Image 1 in a case where there are two images (Image 1 and Image N being fused), where QM represents "quality measure" for a pixel of an image indicated by the subscript and NumImages represents the total number of images being fused. Equation 2 provides an example of global encoding of the quality measure of Image N in a case where there are two images (Image 1 and Image N being fused). Equation 3 provides an example of global encoding for the quality measure of Image 1 in a case where there are three images are being fused.

$$QM_{Image1\_GEncoded} = (QM_{Image1} + QM_{ImageN})/\text{NumImages} * (QM_{Image1}) \quad \text{Eq. 1}$$

$$QM_{ImageN\_GEncoded} = (QM_{ImageN} + QM_{Image1})/\text{NumImages} * (QM_{ImageN}) \quad \text{Eq. 2}$$

$$QM_{Image1\_GEncoded} = (QM_{Image1} + QM_{Image2} + QM_{ImageN})/\text{NumImages} * (QM_{Image1}) \quad \text{Eq. 3}$$

It should be appreciated that this encoding of the quality measures may be performed by a pixel shader 320. In an embodiment where this encoding is performed by a pixel shader 320, a trivial amount may be subtracted, as described above, to prevent any encoded quality measure from having a value of 1, as this would exceed the output value allowed for the pixel shader 320.

With continued reference to FIG. 4A, at procedure 460 of flow diagram 400, in one embodiment, a pixel shader of GPU 230 performs a weighted blending of the image data with the second image data, based on the first globally encoded quality measure and the second globally encoded quality measure, to achieve a fused image data for a third pixel at the identical location in a fused image. For example, Equations 4-6 demonstrate some ways to achieve a fused Red value, $R_F$; a fused Green value, $G_F$; and a fused Blue value, $B_F$, where $R_{Image1}$ is the R value of a pixel of Image 1; $G_{Image1}$ is the G value of a pixel of Image 1; $B_{Image1}$ is the B value of a pixel of Image 1; $R_{ImageN}$ is the R value of a like located pixel of Image N; $G_{ImageN}$ is the G value of a like located pixel of Image N; and $B_{ImageN}$ is the B value of a like located pixel of Image N (like located images share the same coordinate locations in different images).

$$R_F = (R_{Image1} * QM_{Image1\_GEncoded}) + (R_{ImageN} * QM_{ImageN\_GEncoded}) \quad \text{Eq. 4}$$

$$G_F = (G_{Image1} * QM_{Image1\_GEncoded}) + (G_{ImageN} * QM_{ImageN\_GEncoded}) \quad \text{Eq. 5}$$

$$B_F = (B_{Image1} * QM_{Image1\_GEncoded}) + (B_{ImageN} * QM_{ImageN\_GEncoded}) \quad \text{Eq. 6}$$

In some embodiments, the blending in procedure 460 takes place at multiple levels within a Laplacian pyramid of the images being fused. In general, conventional implementation of a Laplacian pyramid for image filtering is known in the art. For example, it is described extensively in the paper "Exposure Fusion" by Tom Mertens, Jan Kautz and Frank Van Reeth, (In proceedings of Pacific Graphics 2007, Maui, Hi., Oct. 29-Nov. 2, 2007). Moreover, the Exposure Fusion paper references an earlier paper titled "The Laplacian Pyramid as a Compact Image Code," by Peter J. Burt and Edward H. Adelson which can be found at Volume: 31, Issue: 4, April 1983, IEEE Transactions on Communications, pp. 532-540. It is appreciated that the techniques for exposure fusion described herein may utilize the Laplacian pyramid techniques described in these papers, but may implement them on pixel shaders 330 of a GPU 220 (rather than on a CPU) by encoding inputs to the pixel shaders and outputs from the pixel shaders in the manner previously described herein.

With continued reference to FIG. 4A, at procedure 470 of flow diagram 400, in one embodiment, the pixel shader 330 outputs the fused image data for inclusion in the fused image 110.

With reference to FIG. 4B, as illustrated in procedure 480 of flow diagram 400, in some embodiments, the method as described in 410-470 may further comprise n pixel shaders 320 of the GPU 220 that operate in parallel to fuse image data for n pairs of like located pixels in the image and the second image, wherein n is greater than 1 and less than or equal to the number of pixel shaders of GPU 220. For example, if GPU 220 includes 1,900 pixel shaders, the parallel operation can comprise up to 1,900 pixel shaders performing the procedures of 410-470 on pairs of like located pixels in the image (e.g., Image 1) and the second image (e.g., Image N).

The examples described herein use image data, quality measures, and global quality measures with values that range between 0 and 1 (or are encoded to range between 0 and 1). Any other scale and/or range may be used in other embodiments. For example, in an embodiment, image data, quality measures, and global quality measures may have values that range between, for example, 0 and 100. In addition, in some embodiments, one or more of the image data, quality measures, and global quality measures may use a different scale and/or range.

Example Uses

Exposure fusion techniques described herein may be used in a stand-alone manner to achieve an improved quality image on an electronic device or in a post-processing environment. In other embodiments, the exposure fusion techniques described herein may be used to improve another product or process. For example, image fusion can be used when stitching together a panoramic image from a number of images captured at stations while rotating an image captured device about a point (e.g., images captured at stations every 30 degrees in a 360 degree rotation of an image capture device). In the panoramic use, lighting is likely to change from station to station, and by capturing and fusing together multiple images at each station, an improved quality panoramic image can be stitched together from the set of fused images. In another embodiment, where photogrammetry is being conducted, multiple images can be fused together from each location of capture used in the photogrammetric process. The drastic increase in speed of exposure fusion using embodiments described herein is an improvement to the technological field of image processing and is an improvement to any electronic device which uses the techniques of exposure fusion with GPUs and pixel shaders, as described herein, to accelerate the fusion of multiple exposures with one another.

Conclusion

Exemplary embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as exemplary forms of implementing the claims.

Various embodiments have been described in various combinations and illustrations. However, any two or more embodiments or features may be combined. Further, any embodiment or feature may be used separately from any other embodiment or feature. Phrases, such as "an embodiment" and "one embodiment," among others used herein, are not necessarily referring to the same embodiment. Features, structures, or characteristics of any embodiment may be combined in any suitable manner with one or more other features, structures, or characteristics.

What is claimed is:

1. A method of fusing images, the method comprising:
encoding first image data of a pixel in a first image to a value between 0 and 1;
determining, by a graphics processing unit (GPU), a first quality measure of the first image data, wherein a value of the first quality measure ranges between 0 and 1;
encoding second image data of a like pixel in a second image to a value between 0 and 1, wherein the first image and the second image have different exposures and are captured by a digital image capture device of the same scene from the same location of capture, and wherein the pixel and the like pixel map to an identical coordinate location within their respective images;
determining, by the GPU, a second quality measure for the second image data, wherein a value of the second quality measure ranges between 0 and 1;
globally encoding, by the GPU, the first quality measure and the second quality measure, based on a number of images to be fused, to achieve a first globally encoded quality measure and a second globally encoded quality measure, wherein a sum of the first globally encoded quality measure and the second globally encoded quality measure is between 0 and 1;
performing, by a pixel shader of the GPU, a weighted blending of the first image data with the second image data, based on the first globally encoded quality measure and the second globally encoded quality measure, to achieve fused image data for a third pixel at the identical coordinate location in a fused image; and
outputting, by the pixel shader, the fused image data for inclusion in the fused image to provide the fused image with improved exposure compared to either the first image or the second image.

2. The method of claim 1 wherein the first image data and the second image data each comprise:
values for colors red, green, and blue; and
a value for at least one of transparency or opacity;
wherein encoding the first image data comprises encoding the value of the at least one of transparency or opacity for the pixel in the first image, and
wherein encoding the second image data comprises encoding the value of the at least one of transparency or opacity for the like pixel in the second image.

3. The method of claim 1 wherein the first quality measure and the second quality measure each comprise at least one of a measure of contrast quality, a measure of saturation quality, or a measure of exposure quality for the pixel and the like pixel respectively.

4. The method of claim 1 wherein the first globally encoded quality measure and the second globally encoded quality measure are each encoded based on the first quality measure, the second quality measure, and the number of images to be fused.

5. The method of claim 1 wherein the weighted blending of the first image data with the second image data comprises:
blending a value for color red of the first image data with a value for the color red of the second image data;
blending a value for color green of the first image data with a value for the color green of the second image data;
blending a value for color blue of the first image data with a value for the color blue of the second image data; and
blending a value for at least one of transparency or opacity of the first image data with a corresponding value of the second image data.

6. The method of claim 1 wherein the weighted blending of the first image data with the second image data is performed at multiple levels of a Laplacian pyramid.

7. The method of claim 1 further comprising concurrently operating n pixel shaders of the GPU in parallel to fuse image data for n pairs of like located pixels in the first image and in the second image, wherein n is greater than 1 and less than or equal to the number of pixel shaders of the GPU.

8. An electronic device comprising;
a memory configured to store a first digital image and a second digital image; and
a graphics processing unit (GPU) coupled with the memory, the GPU configured to:
determine a first quality measure for first image data of a pixel in a first image;
determine a second quality measure for second image data of a like pixel in a second image, wherein the first image and the second image have different exposures and are captured by a digital image capture device of the same scene from the same location of capture, and wherein the pixel and the like pixel map to an identical coordinate location within their respective images;
globally encode the first quality measure and the second quality measure, using a divisor relating to a number of images to be fused, to achieve a first globally encoded quality measure and a second globally encoded quality measure;
determine, by a pixel shader of the GPU, a weighted blending of the first image data with the second image data, based on the first globally encoded quality measure and the second globally encoded quality measure, to achieve fused image data for a third pixel at the identical coordinate location in a fused image; and
output, by the pixel shader, the fused image data for inclusion in the fused image.

9. The electronic device of claim 8 wherein the GPU is further configured to:
encode the first image data of the pixel in the first image to a value between 0 and 1; and
encode the second image data of the like pixel in the second image to a value between 0 and 1;
wherein a value of the first quality measure ranges between 0 and 1, a value of the second quality measure ranges between 0 and 1, and a sum of the first globally encoded quality measure and the second globally encoded quality measure is between 0 and 1.

10. The electronic device of claim 8 further comprising a digital camera, wherein the memory and the GPU are disposed within the digital camera.

11. The electronic device of claim 8 further comprising an output configured to display the fused image.

12. The electronic device of claim 8 wherein the weighted blending of the first image data with the second image data is performed at multiple levels of a Laplacian pyramid.

13. The electronic device of claim 8 wherein the first quality measure comprises at least one of a measure of contrast quality of the first image data, a measure of saturation quality of the first image data, or a measure of exposure quality of the first image data.

14. The electronic device of claim 8 wherein the GPU is further configured to operate n pixel shaders in parallel to fuse image data for n pairs of like located pixels in the first image and in the second image, wherein n is greater than 1 and less than or equal to the number of pixel shaders of the GPU.

15. A non-transitory computer-readable storage medium comprising instructions embodied thereon which, when executed, cause an electronic device to perform a method of fusing images, the method comprising:
encoding first image data of a pixel in a first image;
determining, by a graphics processing unit (GPU), a first quality measure of the first image data;
encoding second image data of a like pixel in a second image, wherein the first image and the second image have different exposures and are captured by a digital image capture device of the same scene from the same location of capture, and wherein the pixel and the like pixel map to an identical coordinate location within their respective images;
determining, by the GPU, a second quality measure for the second image data;
globally encoding, by the GPU, the first quality measure and the second quality measure, using a divisor relating to a number of images to be fused, to achieve a first globally encoded quality measure and a second globally encoded quality measure;
performing, by a pixel shader of the GPU, a weighted blending of the first image data with the second image data, based on the first globally encoded quality measure and the second globally encoded quality measure, to achieve fused image data for a third pixel at the identical coordinate location in a fused image; and
outputting, by the pixel shader, the fused image data for inclusion in the fused image.

16. The non-transitory computer-readable storage medium of claim 15 wherein the first image data and the second image data each comprise:
values for colors red, green, and blue; and
a value for at least one of transparency or opacity;
wherein encoding the first image data comprises encoding the value for the at least one of transparency or opacity for the pixel in the first image, and
wherein encoding the second image data comprises encoding the value for the at least one of transparency or opacity for the like pixel in the second image.

17. The non-transitory computer-readable storage medium of claim 15 wherein the first quality measure and the second quality measure each comprise at least one of a measure of contrast quality, a measure of saturation quality, or a measure of exposure quality for the pixel and the like pixel respectively.

18. The non-transitory computer-readable storage medium of claim 15 wherein the first image data and the second image data are encoded to values between 0 and 1, values of the first quality measure and the second quality measure range between 0 and 1, and a sum of the first globally encoded quality measure and the second globally encoded quality measure is between 0 and 1.

19. The non-transitory computer-readable storage medium of claim 15 wherein the weighted blending of the first image data with the second image data comprises:
blending a value for color red of the first image data with a value for the color red of the second image data;
blending a value for color green of the first image data with a value for the color green of the second image data;
blending a value for color blue of the first image data with a value for the color blue of the second image data; and
blending a value for at least one of transparency or opacity of the first image data with a corresponding value of the second image data.

20. The non-transitory computer-readable storage medium of claim 15 further comprising instructions to operate n pixel shaders of the GPU in parallel to fuse image data for n pairs of like located pixels in the first image and in the second image, wherein n is greater than 1 and less than or equal to the number of pixel shaders of the GPU.

* * * * *